(12) United States Patent
Sakata et al.

(10) Patent No.: US 6,396,372 B1
(45) Date of Patent: May 28, 2002

(54) ELECTROSTATIC MICRO RELAY

(75) Inventors: Minoru Sakata; Yoshiyuki Komura; Takuya Nakajima; Tomonori Seki, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/529,720

(22) PCT Filed: Oct. 21, 1998

(86) PCT No.: PCT/JP98/04759

§ 371 (c)(1),
(2), (4) Date: Jul. 5, 2000

(87) PCT Pub. No.: WO99/21204

PCT Pub. Date: Apr. 29, 1999

(30) Foreign Application Priority Data

Oct. 21, 1997 (JP) .............................................. 9-288405

(51) Int. Cl.[7] .............................................. H01H 51/22
(52) U.S. Cl. .......................................... 335/80; 257/427
(58) Field of Search ................................. 257/414, 421, 257/424.7; 335/78–86, 128; 331/200; 361/233, 207; 200/181

(56) References Cited

U.S. PATENT DOCUMENTS

| 4,581,624 A | * | 4/1986 | O'Connor ................... 257/414 |
| 4,959,515 A | * | 9/1990 | Zavracky et al. ........... 200/181 |
| 5,467,068 A | * | 11/1995 | Field et al. .................... 335/4 |
| 5,620,933 A | * | 4/1997 | James et al. .................. 216/2 |

FOREIGN PATENT DOCUMENTS

| DE | 4205340 | | 8/1993 |
| DE | 4305033 | | 10/1993 |
| JP | 6-12963 | * | 1/1984 |
| JP | 7-45175 | | 2/1995 |
| JP | 8-227646 | | 3/1996 |
| JP | 8-509093 | | 9/1996 |
| WO | 94/18688 | | 8/1994 |

* cited by examiner

Primary Examiner—Lincoln Donovan
(74) Attorney, Agent, or Firm—Morrison & Foerster LLP

(57) ABSTRACT

A movable substrate 20 is supported on a base 10 via first beam portions 22. A movable contact 28 is supported on the movable substrate 20 via a second beam portion 23 which has an elasticity larger than the first beam portions 22.

3 Claims, 5 Drawing Sheets

ELECTROSTATIC MICRO RELAY

TECHNICAL FIELD

The present invention relates to an electrostatic microrelay which is driven by electrostatic attraction.

BACKGROUND ART

Conventionally, for example, there has been provided an electrostatic microrelay having a flat fixed electrode and a bent movable electrode (Japanese Patent Laid-Open Publication HEI 8-255546). In this electrostatic microrelay, by driving the movable electrode with electrostatic attraction that occurs with a voltage applied to between the electrodes, a movable contact provided at a free end portion of the movable electrode is put into contact, i.e. contact-making, with a fixed contact provided in the fixed electrode.

However, in this electrostatic microrelay, increasing the contact pressure at a contact-making involves suppressing the elasticity of the bent portion of the movable electrode to a small one. This would cause a problem that the opening force at a contact-breaking becomes smaller, resulting in deteriorated response characteristic. Conversely, increasing the elasticity at the bent portion of the movable electrode would necessitate a large driving force for the movable electrode to be attracted to the fixed electrode, which leads to a problem that the drive voltage must be increased. That is, the movable electrode is required to have two characteristics contradictory to each other, which could not be managed by the electrostatic microrelay of the above constitution.

DISCLOSURE OF THE INVENTION

The present invention having been accomplished to the above problems, an object of the invention is to provide an electrostatic microrelay which is good at response characteristic and which is capable of suppressing the drive voltage.

In order to achieve the above object, according to the present invention, there is provided an electrostatic microrelay in which a fixed contact of a base and a movable contact of a movable substrate are contactable with and separable from each other based on an electrostatic attraction generated with a voltage applied to between a fixed electrode of the base and a movable electrode of the movable substrate, wherein the movable electrode is evenly supported on the base via at least two elastic support portions.

With this constitution, when a voltage is applied to between the fixed electrode and the movable electrode opposed to each other, the elastic support portions are flexed by the electrostatic attraction, so that the movable contact and the fixed contact are put into contact with each other. Since the elastic support portions are provided in at least two in number evenly, the elasticity at each elastic support portion is a small one which acts evenly. Therefore, the movable electrode is smoothly attracted to the fixed electrode so that the movable contact and the fixed contact exhibits a stable, reliable contact-making. As a result of this, the contact reliability of the contacts is improved. Also, when the electrostatic attraction between the two electrodes is removed, the elasticity of the elastic support portion acts as a force for contact-breaking.

In the electrostatic microrelay as defined above, preferably, the elastic support portions are disposed so as to be opposed to the fixed electrode, in which case electrostatic attraction can be generated also between the elastic support portions and the fixed electrode so that the drive voltage can be suppressed.

Also preferably, the movable contact is supported on the movable substrate via a second elastic support portion which has an elasticity larger than the elastic support portion, in which case the contact reliability of the contacts can be further improved.

More specifically, with this constitution, with a voltage applied to between the fixed electrode and the movable electrode opposed to each other, the elastic support portions are flexed by electrostatic attraction, causing the movable electrode to be closer to the fixed electrode, with the result that the movable contact makes contact with the fixed contact. In this state, because the distance between the movable electrode and the fixed electrode is narrower than its initial state, an even larger electrostatic attraction acts for the attraction, causing the second elastic support portion to be flexed so that the movable electrode is attracted by the fixed electrode. Since the second elastic support portion is larger in elasticity than the elastic support portions, the movable contact makes contact with the fixed contact by a large load. Thus, without occurrence of any malfunctions due to vibrations or the like, the movable contact is put into a contact-making with the fixed contact at a desired contact pressure by the second elastic support portion. As a result, the contact reliability can be enhanced.

The elastic support portions may be implemented by at least two first beam portions extending sideways from anchors standing on the base, and the second elastic support portion may be implemented by a second beam portion obtained by at least one opening portion formed beside the movable contact of the movable substrate. In this case, the operating characteristics can be stabilized.

When the movable substrate is implemented by a single crystal silicon substrate, all the constituent members can be processed by semiconductor process, where variations in dimensional precision can be suppressed while a specifically life characteristic can be attained.

When the base is implemented by a glass substrate, the movable substrate formed of a single crystal silicon substrate can be integrated by anodic bonding, facilitating the assembly work. Further, capacitance among the fixed electrode, the fixed contact, interconnections and connecting pads on the base can be suppressed to low ones, so that high-frequency characteristics can be improved.

BEST MODE FOR CARRYING OUT THE INVENTION

Next, an electrostatic microrelay according to the present invention is described with reference to the accompanying drawings.

Figure 1A:
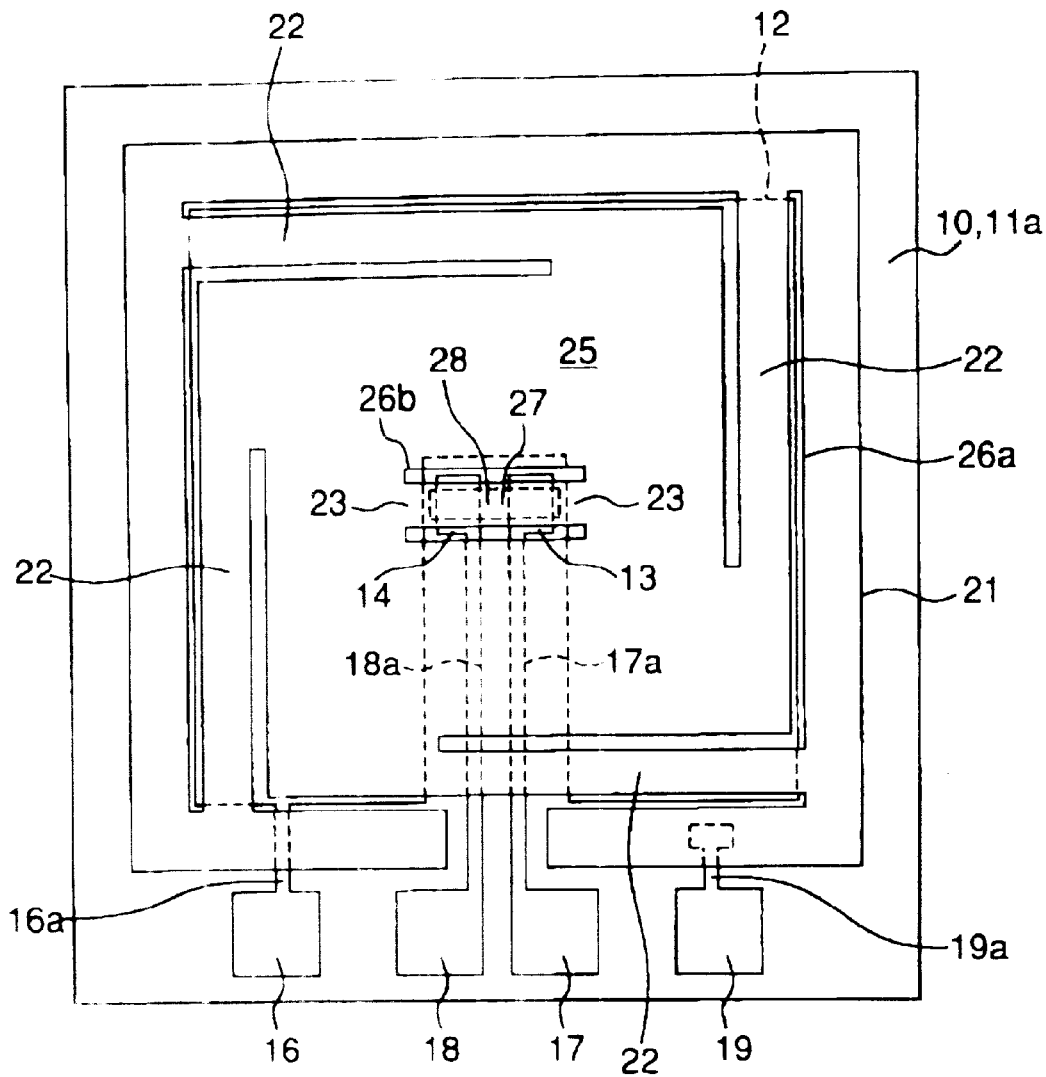
FIG. 1A is a plane view of an electrostatic microrelay according to the present embodiment and FIG. 1B is a sectional view taken along the line 1B—1B of FIG. 1A.
Figure 1B:
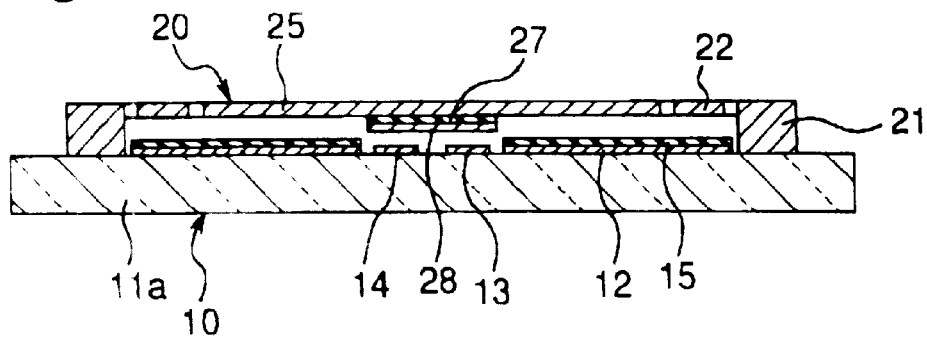

FIGS. 1A and 1B show an electrostatic microrelay according to this embodiment. This electrostatic microrelay is formed by integrating a movable substrate 20 implemented by a silicon wafer, on top of a base 10 implemented by a glass substrate 11a.

The base 10 has a fixed electrode 12 and fixed contacts 13, 14 provided on the top surface of the glass substrate 11a. The surface of the fixed electrode 12 is coated with an insulating film 15. The fixed electrode 12 and the fixed contacts 13, 14 are connected to connecting pads 16 and 17, 18 via wiring patterns 16a and 17a, 18a, respectively.

The movable substrate 20 has a movable electrode 25 evenly supported via first beam portions 22 extending sideways from top-surface edge portions of four anchors 21 standing at top-surface corner portions of the base 10.

The anchors 21 are connected to a connecting pad 19 via a wiring pattern 19a provided on the top surface of the base 10. The movable electrode 25 has second beam portions 23 formed at its center by a pair of slits 26b, 26c. At a center of the second beam portions 23 in the lower surface, is provided a movable contact 28 via an insulating film 27. The movable contact 28 is contactably and separably opposed to the fixed contacts 13, 14.

Next, the manufacturing process of an electrostatic microrelay having the above constitution is described.

Figure 2A:
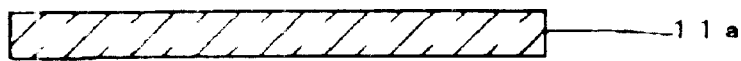
FIGS. 2A–2I are sectional views showing manufacturing process of FIG. 1.
Figure 2B:
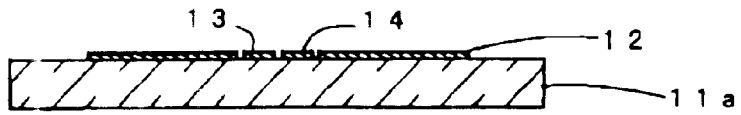
Figure 2C:
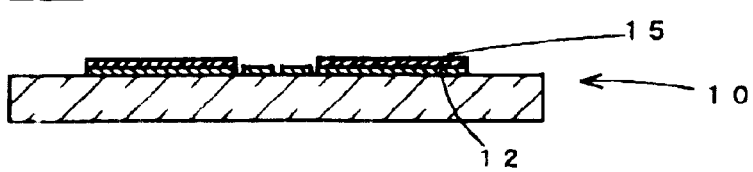

First, as shown in FIG. 2B, the fixed electrode 12 and the fixed contacts 13, 14 are formed on the glass substrate made of Pyrex or the like shown in FIG. 2A with use of Cr, Au or the like by vapor deposition (plating, sputtering or the like). Further concurrently with this, the wiring patterns 16a, 17a, 18a, 19a and the connecting pads 16, 17, 18 and 19 are formed respectively. Then, the insulating film 15 is formed on the fixed electrode 12, by which the base 10 shown in FIG. 2C is completed.

In addition, when a silicon oxide having a relative dielectric constant of 3–4 or a silicon nitride having a relative dielectric constant of 7–8 is used as the insulating film 15, large electrostatic attraction can be obtained and contact load can be increased.

Figure 2D:
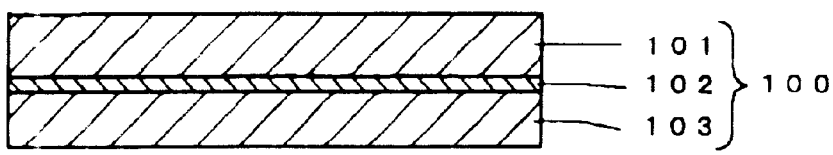
Figure 2E:
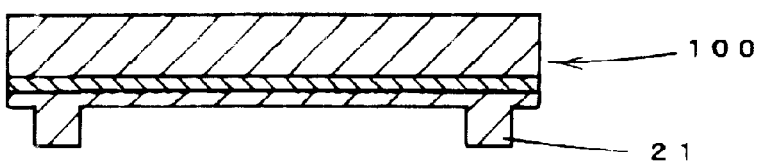
Figure 2F:
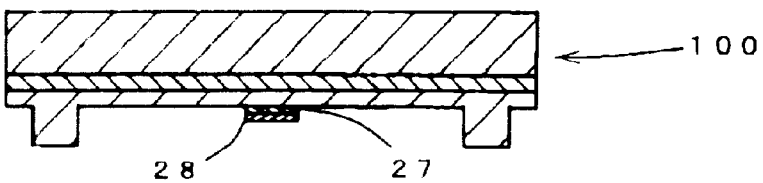

Meanwhile, as shown in FIG. 2D, in order to form a contact-to-contact gap in the lower surface of an SOI wafer 100 comprising a silicon layer 101, a silicon oxide layer 102 and a silicon layer 103 in an order from the top, for example, wet etching by TMAH with silicon oxide used as a mask is performed, by which the anchors 21 protruding downward are formed as shown in FIG. 2E. Then, an insulating film 27 is formed and thereafter the movable contact 28 is formed as shown in FIG. 2F.

Figure 2G:
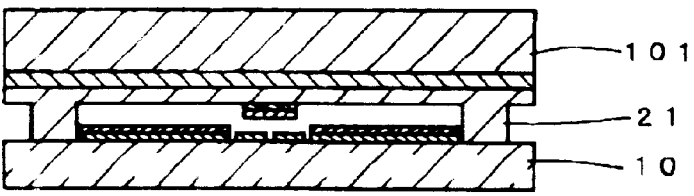
Figure 2H:
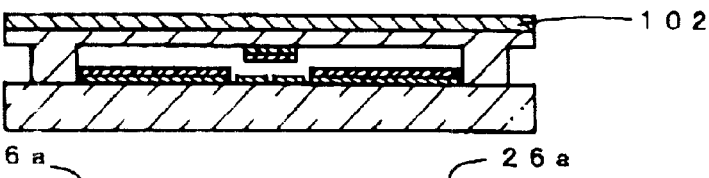
Figure 2I:
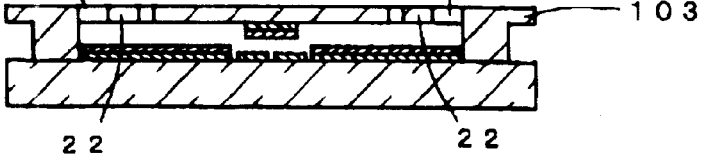

Subsequently, as shown in FIG. 2G, the SOI wafer 100 is integrally coupled with the base 10 by anodic bonding. Then, as shown in FIG. 2H, the top surface of the SOI wafer 100 is etched, thereby thinned, to the silicon oxide layer 102, which is an oxide film, by alkali etchant such as TMAH or KOH. Further, the silicon oxide layer 102 is removed by fluoric etchant, making the silicon layer 103, i.e. the movable electrode 25, exposed as shown in FIG. 2I. Then, pattern-drawing etching is done by dry etching with the use of RIE or the like, by which cutout portions 26a and slits 26b, 26c are formed, and first, second beam portions 22, 23 are cut out. Thus, the movable substrate 20 is completed.

In addition, the base 10 is not limited to the glass substrate 11a and may be formed of a single crystal silicon substrate coated, at least at its top surface, with an insulating film.

In this embodiment, the whole movable substrate 20 is formed of a silicon wafer alone and so formed as to be point-symmetrical between left and right and line-symmetrical in cross section. This makes the movable electrode 25 less prone to deflection and torsion. As a result of this, inoperability and variations in operating characteristics can be effectively prevented, and moreover smooth operating characteristics can be ensured.

Next, operation of the electrostatic microrelay having the above constitution is described with reference to a schematic view of FIG. 3.

Figure 3A:
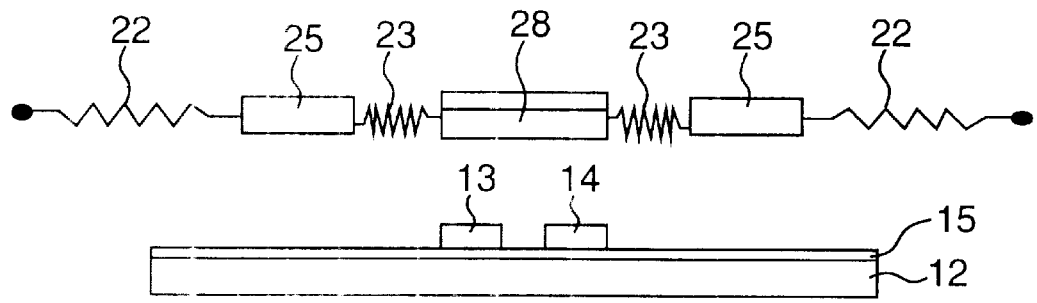
FIGS. 3A–3C are a schematic view showing operating state of the electrostatic microrelay of FIG. 1.
Figure 3B:
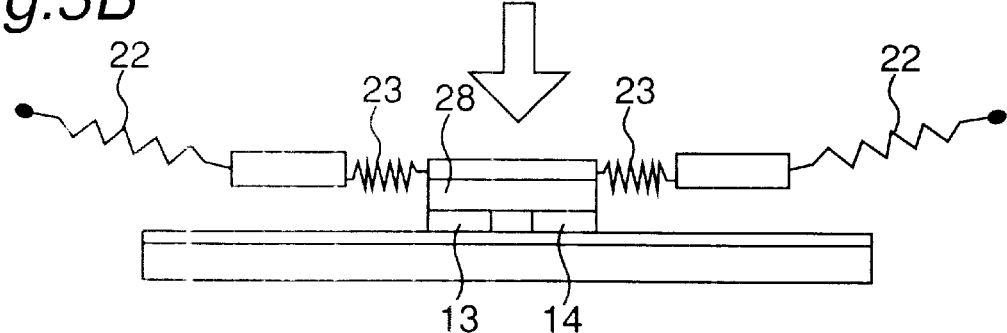

First, with no voltage applied between the fixed electrode 12 and the movable electrode 25, the fixed electrode 12 and the movable electrode 25 hold parallelism, where the movable contact 28 is opened separate from the fixed contacts 13, 14 as shown in FIGS. 1B and 3A.

Next, with a voltage applied between the fixed electrode 12 and the movable electrode 25, the movable electrode 25 is attracted to the fixed electrode 12 by electrostatic attraction that occurs between the electrodes 12, 25. Due to this, the first beam portions 22 are flexed, causing the movable electrode 25 to be closer to the fixed electrode 12. As a result of this, the gap becomes narrower, so that the movable electrode 25 is attracted by the fixed electrode 12 with a stronger electrostatic attraction until the movable contact 28 makes contact with the fixed contacts 13, 14.

Figure 3C:
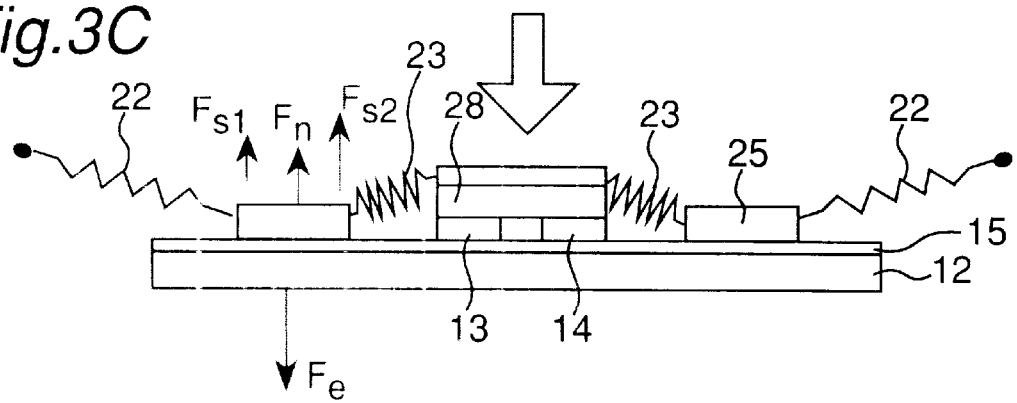

After the movable contact 28 has come into contact with the fixed contacts 13, 14, the second beam portions 23 in addition to the first beam portions 22 are flexed as shown in FIG. 3C, so that the movable electrode 25 is attracted to the insulating film 15, with which the fixed electrode 12 is coated. Therefore, with an arrangement in which the base 10 and the movable substrate 20 are placed opposite to each other, the fixed electrode 12 and the movable electrode 25 are held in stabilized parallelism so that the movable contact 28, with its neighboring movable electrode 25 attracted to the fixed electrode 12, is pressed against the fixed contacts 13, 14 via the second beam portions 23. Thus, there never occurs one-side hitting, as would be seen in the prior art, so that the contact reliability is improved.

In this case, assuming that forces of the first, second beam portions 22, 23, an electrostatic attraction between the movable electrode 25 and the fixed electrode 12 via the insulating film 15, and a reaction force derived from the surface of the insulating film 15 are $F_{s1}$, $F_{s2}$, $F_e$, $F_n$, then the following relationship holds:

$$F_e = F_{s1} + F_{s2} + F_n$$

so that $F_{s2}$, i.e. contact load, can be inhibited from lowering (from an ideal model) by reducing $F_{en}$, $F_{s1}$ by designing the spring constant of the first, second beam portions 22, 23, the initial gap between the movable electrode 25 and the fixed electrode 12, the thickness of the contacts and the like.

Accordingly, with the aforementioned voltage application halted, the movable electrode 25 is separated from the fixed electrode 12 by the elasticity of the second beam portions 23 and the first beam portions 22, and thereafter the movable contact 28 is opened separate from the fixed contacts 13, 14 only by the elasticity of the first beam portions 22 with the movable electrode 25 restored to its original state.

In addition, the movable electrode 25, whereas formed into a flat shape in the above embodiment, may be formed into a thin wall with a recessed portion formed in its top surface. In this case, while desired rigidity is satisfied, the electrostatic microrelay can be further improved in operating speed and restoring speed even if light in weight.

It is also possible to form an insulating film at the lower surface of the movable electrode, and moreover to stack and integrate thereon a second movable electrode and an insulating film one by one. In this case, by forming the second movable electrode from a material having a high dielectric constant, an even larger electrostatic attraction can be obtained.

It is also possible that the movable electrode 25 made larger in thickness than the beam portions 22, 23, so as to be larger in rigidity. In this case, the electrostatic attraction can be fully transformed into the attraction force for the movable electrode 25, so that the electrostatic attraction can be efficiently used for the deformation of the first beam portions 22.

It is also possible that a protrusion is provided at a peripheral end portion of the lower surface of the movable electrode 25 so that electrostatic attraction at the initial operation becomes even larger.

Figure 4:
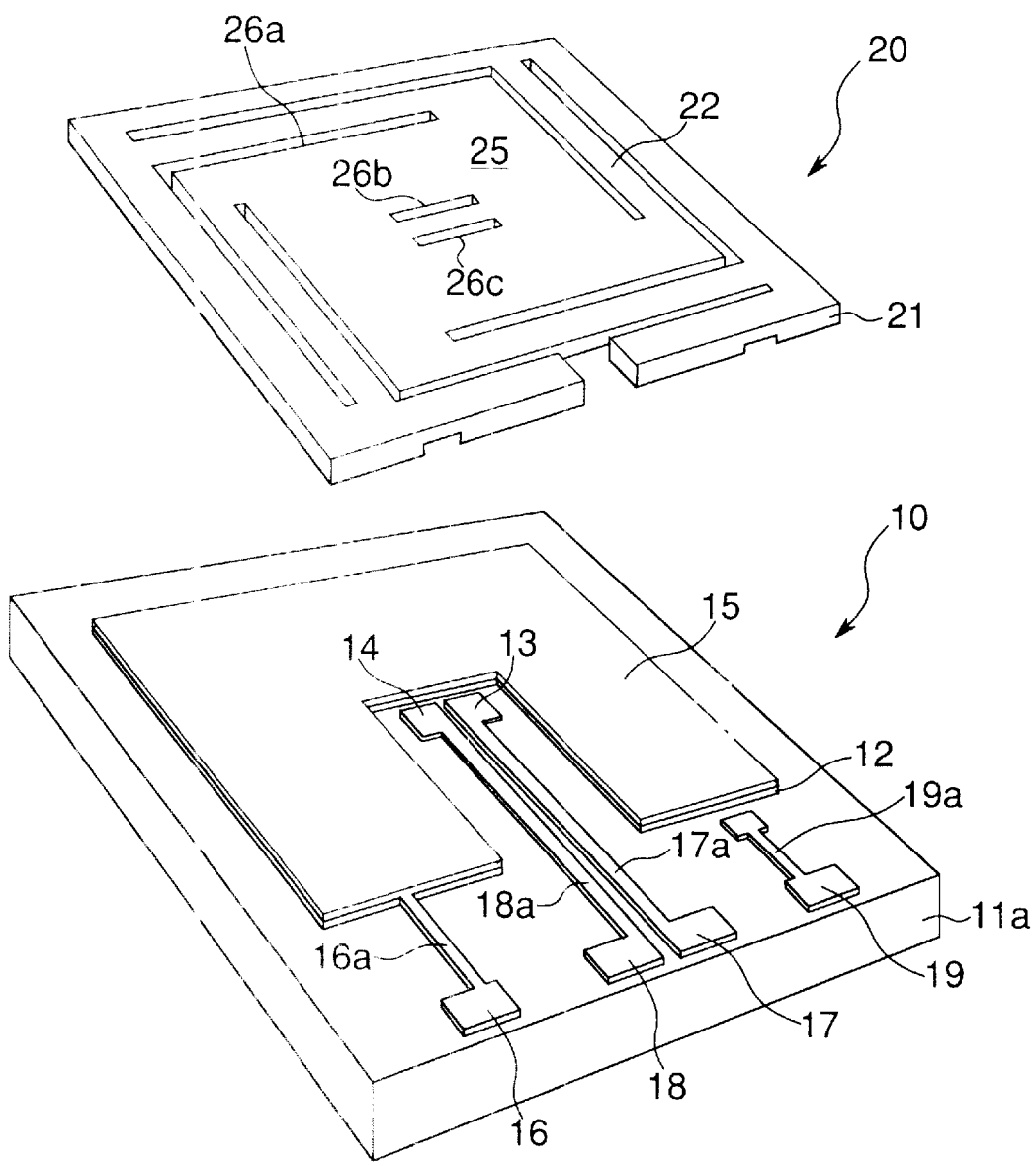
FIG. 4 is an exploded perspective view of the electrostatic microrelay of FIG. 1.
Figure 5:
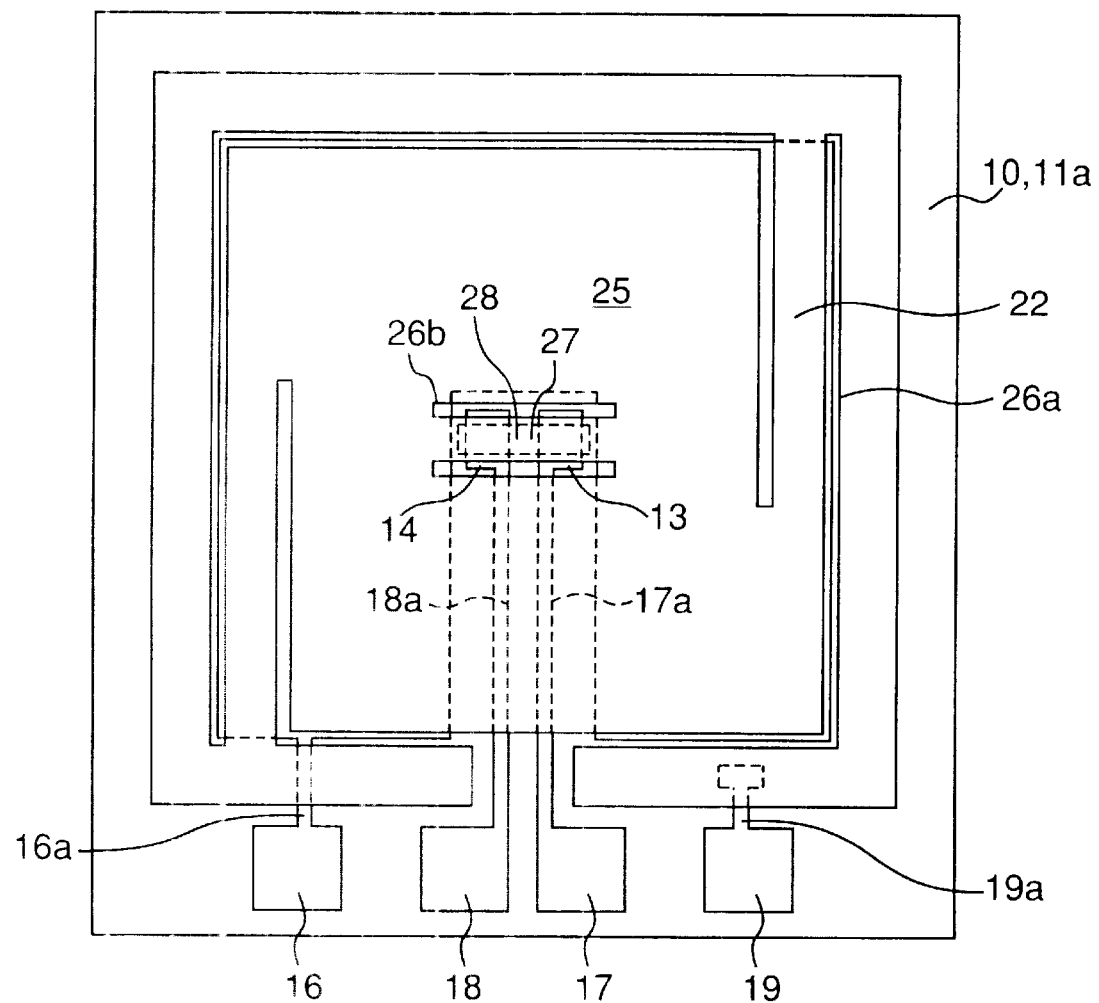
FIG. 5 is a plane view of an electrostatic microrelay according to another embodiment.

The movable substrate, whereas supported by the four first beam portions in the above embodiment, may also be supported by three or two first beam portions. In this case, an electrostatic microrelay which is good at area efficiency can be obtained. FIG. 4 shows an actual example of the electrostatic microrelay in which the movable substrate is supported by two first beam portions. This electrostatic microrelay is similar in constitution to that of FIG. 1 except that the first beam portions 22 are provided in two.

Further, the second beam portions 23, whereas formed of the two slits 26b, 26c, may also be formed of a generally U-shaped opening portion.

Further, if the fixed electrode 12 has portions opposed to the first beam portions 22, the fixed electrode 12 is enabled to attract not only the movable electrode 25 but the first beam portions 22 as well, in which case the drive voltage can be further reduced.

What is claimed is:

1. An electrostatic microrelay in which a fixed contact positioned on the top-surface of a base and a movable contact positioned on the under-surface of a movable substrate are contactable with and separable from each other based on an electrostatic attraction generated with a voltage applied to between a fixed electrode positioned on the top-surface of the base and a movable electrode positioned on the under-surface of the movable substrate via an isolation layer, wherein on the top-surface of the base, two fixed contacts which are contactable with and separable from the movable contact are disposed, and wired patterns which are electrically contacted with the fixed contacts are formed, the fixed electrode and the movable electrode respectively, the movable substrate is made of single crystal silicone and at least two first elastic support portions which extend from the anchors standing on the top-surface of the base and being disposed so as to be opposed to the fixed electrode supports the movable electrode evenly which is electrically contacted to the wired patterns via the anchors and the first elastic support portions, the movable electrode supports the movable contact via second elastic support portion which has an elasticity larger than the first elastic support portion, the first elastic support portions and the second elastic support portion are incorporated on the movable substrate, the first elastic support portions are elastically deformed by the elastic attraction and the movable contact comes into contract with the fixed contact, and then the desirable pressure between the movable contact and the fixed contacts are obtained by the elastic power of the second elastic portion when the movable electrode is attracted to the fixed electrode, and when the contacts are closed, elastic forces of the first portion and the second portion act in opposite directions.

2. An electrostatic microrelay according to claim 1, wherein the wired patterns which are formed on the top-surface of the base extend to the same direction from the each fixed contacts, and the fixed electrode is continuously closed round the wired patterns to supply electric power to the fixed electrode from one location.

3. An electrostatic microrelay according to anyone of claims 1 or 2, wherein the base is made of a glass substrate.

* * * * *